United States Patent
Hashimura et al.

[11] Patent Number: 5,386,863
[45] Date of Patent: Feb. 7, 1995

[54] PNEUMATIC TIRE AND WHEEL WITH ASYMMETRIC STRUCTURE

[75] Inventors: Yoshiaki Hashimura, Isehara; Masakazu Okihara, Hiratsuka; Yusaku Miyazaki, Hiratsuka; Zenichiro Shida, Hiratsuka; Naoyuki Katsura, Hiratsuka; Tomohiko Kogure, Minami-Ashigara, all of Japan

[73] Assignee: The Yokohama Rubber Co., Ltd., Tokyo, Japan

[21] Appl. No.: 2,362

[22] Filed: Jan. 6, 1993

[30] Foreign Application Priority Data

Jan. 22, 1992 [JP] Japan .................. 4-009224

[51] Int. Cl.⁶ .................. B60C 3/06; B60C 13/00
[52] U.S. Cl. .................. 152/454; 152/455; 152/456; 152/523; 152/525
[58] Field of Search .................. 152/454–456, 152/523–525; D12/152; 156/123 A

[56] References Cited

U.S. PATENT DOCUMENTS

| | | | |
|---|---|---|---|
| 3,363,660 | 1/1968 | Mirtain et al. | 152/455 X |
| 3,435,875 | 4/1969 | Devienne | 152/455 |
| 3,578,054 | 5/1971 | Boileau | 156/123 A X |
| 4,266,995 | 5/1981 | Kitazawa et al. | 152/525 X |

FOREIGN PATENT DOCUMENTS

| | | | |
|---|---|---|---|
| 2031901 | 2/1990 | Japan | 152/455 |
| 1115834 | 5/1968 | United Kingdom | 152/455 |

*Primary Examiner*—Michael W. Ball
*Assistant Examiner*—Adrienne C. Johnstone
*Attorney, Agent, or Firm*—Nikaido, Marmelstein, Murray & Oram

[57] ABSTRACT

A pneumatic tire to be fitted on a wheel wherein a position, in which a disc is connected to a rim, is offset from the cneter of width of the rim toward the outer surface of the wheel, characterized in that a ratio (Ho/Hi) of an attenuation coefficient Ho ($=Go \times \tan\delta o$) determined on the basis of an average thickness Go of an outer side wall of the tire on the outer side of the wheel and a loss factor $\tan\delta o$ of the rubber of this side wall to that Hi ($=Gi \times \tan\delta i$) determined on the basis of an average thickness Gi of an inner side wall of the tire on the inner side of the wheel and a loss factor $\tan\delta i$ of the rubber of this side wall is set in the range of 1.2–6.5.

6 Claims, 1 Drawing Sheet

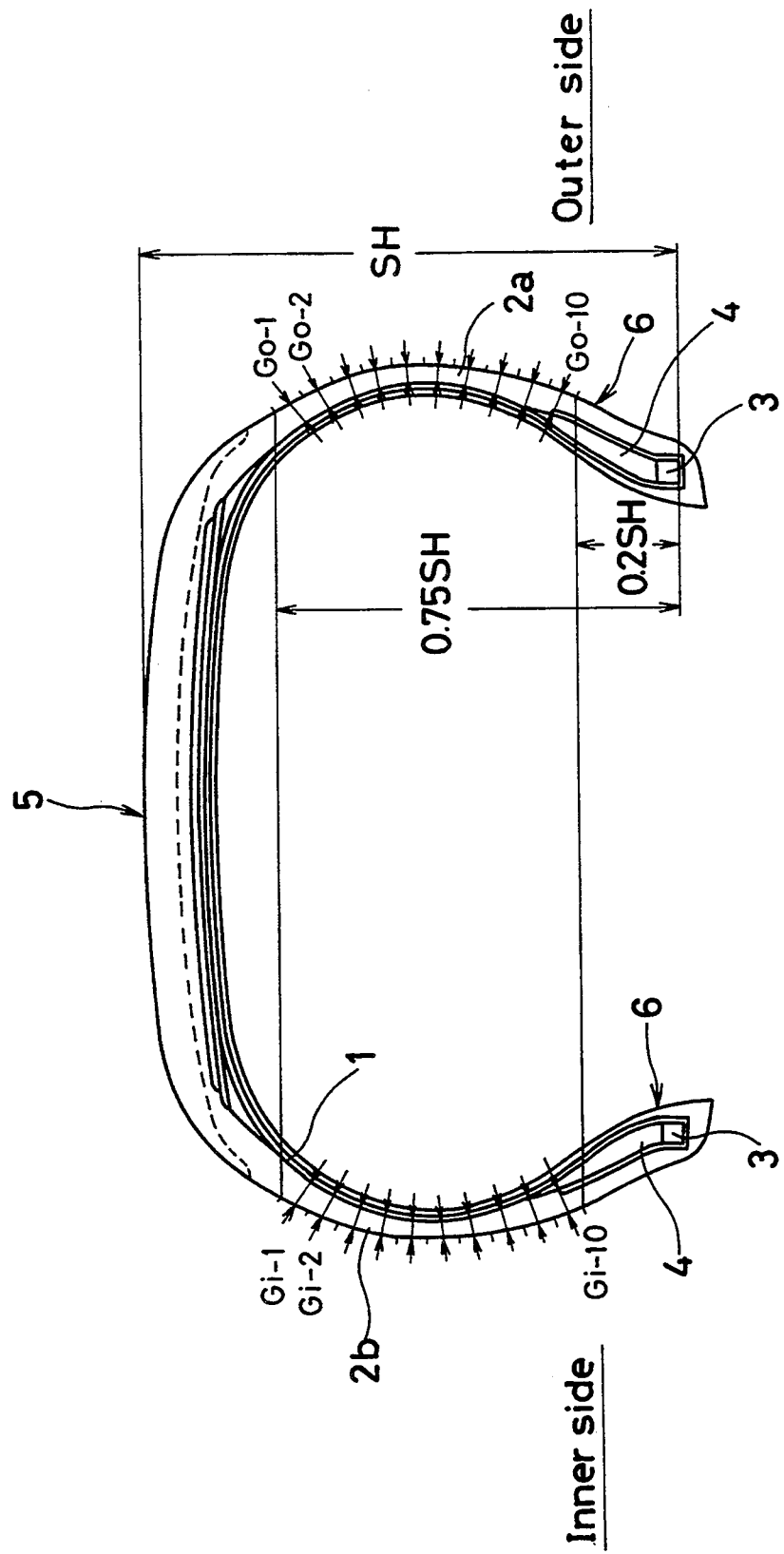

PNEUMATIC TIRE AND WHEEL WITH ASYMMETRIC STRUCTURE

BACKGROUND OF THE INVENTION

This invention relates to a pneumatic tire adapted to improve the driving comfort of a vehicle without causing a decrease in the driving performance of the vehicle including the maneuvering stability thereof.

It has strongly been demanded of late that a pneumatic tire has as its characteristics a capability of not only improving the driving performance of a vehicle including the stability thereof but also further improving the driving comfort of a vehicle. The driving comport dependent upon the quality of a tire is represented by an impact value of vibration and the magnitude of noise which are transmitted from a road surface to the interior of a vehicle via the tire. The path through which the vibration referred to above is transmitted to the interior of a vehicle passes a tread of a tire, outer and inner side walls thereof, outer and inner beads, a rim/-disc and a vehicle body.

Therefore, in a conventional regularly-used method of improving the driving comfort of a vehicle, the rigidity of mainly both side walls of a tire is reduced by minimizing the dimensions of the bead fillers, whereby the force of restoring an external force which the side walls receive from the road surface is reduced.

However, when the rigidity of both side walls is thus reduced, the driving performance of a vehicle including the stability thereof decreases.

In accordance with the development of the front wheel driving techniques in the vehicle driving system utilized in recent years and the development of expansion of the space in the interior of a vehicle, the techniques for forming an asymmetric wheel structure in which the space in the inner part thereof is increased to as great an extent as possible has progressed, and a tendency to gradually increase the quantity of variation by which a position, in which a disc is connected to a rim, is offset from the center of width of the rim toward the outer surface of the wheel has been seen. The inventors of the present invention have made a study of the relation between an asymmetrically formed wheel and the propagation of vibration from a tire to the wheel to discover that there is close correlation therebetween.

The results of an investigation on the transmission rate of vibration propagated from the side walls of a tire to a wheel of an asymmetric structure show the following. A transmission rate of vibration propagated via a rim end at the outer side of a wheel is higher than that of vibration propagated via a rim end at the inner side of the wheel, and this tendency becomes more distinct in proportion to a distance by which a position, in which a disc is connected to a rim, is offset from the center of width of the rim.

The inventors of the present invention have thoroughly discussed such new knowledge with respect to the maneuvering stability of a vehicle to discover that, when this knowledge is skillfully utilized, the driving comfort of a vehicle can be improved with the maneuvering stability and driving comfort, which have a trade-off relation as mentioned above, kept compatible with each other.

SUMMARY OF THE INVENTION

An object of the present invention is to provide a pneumatic tire capable of improving the driving comfort of a vehicle without causing a decrease in the driving performance of the vehicle including the maneuvering stability thereof.

To achieve this object, the present invention provides a pneumatic tire to be fitted on a wheel wherein a position, in which a disc is connected to a rim, is offset from the center of width of the rim toward the outer surface of the wheel when the wheel is mounted on the vehicle, characterized in that a ratio (Ho/Hi) of an attenuation coefficient Ho ($=Go \times \tan\delta o$) determined on the basis of a multi-spot averaged thickness Go of an outer side wall of the tire on the outer side of the wheel and a loss factor $\tan\delta o$ of the rubber of this side wall to that Hi ($=Gi \times \tan\delta i$) determined on the basis of a multi-spot averaged thickness Gi of an inner side wall of the tire on the inner side of the wheel and a loss factor $\tan\delta i$ of the rubber of this side wall is set in the range of 1.2–6.5.

According to the present invention, a ratio (Ho/Hi) of an attenuation coefficient Ho of an outer side wall of a tire to that Hi of an inner side wall thereof is set in the range of 1.2–6.5 on the basis of the knowledge that a transmission rate of vibration propagated via an offset-side rim end at the outer side of a wheel is higher than that of vibration propagated via an anti-offset-side rim end at the inner side of the wheel, whereby the vibration attenuation rate at the outer side of the tire is set relatively high. Namely, the vibration transmission rate at the outer side of the tire is set relatively low by setting the multi-spot averaged thickness Go of the outer side wall of the tire larger than that Gi of the inner side wall thereof or by setting a loss factor $\tan\delta o$ of the rubber constituting the outer side wall of the tire higher than that $\tan\delta i$ of the rubber constituting the inner side wall thereof. When a pneumatic tire in which the outer and inner side walls are thus formed asymmetrically is fitted on an asymmetric wheel having a large quantity of variation of an offsetting distance, the vibration transmission rate of an outer side portion of the tire which is fixed to the offset-side rim end at the outer side of the wheel becomes relatively low. This enables the quantity of vibration transmitted from the tire to the vehicle body via the wheel to decrease, and the driving comfort to be improved. When the rigidity of the outer and inner side walls of the tire is set equal to or not lower than that of the side walls of a conventional pneumatic tire, the driving performance of a vehicle including the maneuvering stability thereof does not substantially decrease.

According to the present invention, the outer or offset-side side of a wheel and a tire means a side positioned at the outer side of a vehicle when these parts are fixed to the vehicle, and, conversely, the inner or anti-offset side of these parts a side positioned at the inner side of the vehicle at the mentioned time.

BRIEF DESCRIPTION OF THE DRAWINGS

FIG. 1 is a sectional view of the pneuamtic tire according to the present invention.

DESCRIPTION OF THE PREFERRED EMBODIMENT

Referring to FIG. 1, a reference numeral 1 denotes a carcass, 2a, 2b side walls, 3 bead cores, 4 bead fillers, 5 a tread, and 6 bead portions. The carcass 1 is provided on the inner side of the side walls 2a, 2b, and folded back at both end portions thereof from the inner side of the tire to the outer side thereof around the bead cores 3 so that these folded portions extend along the bead fillers 4. A ratio of an attenuation coefficient Ho of the side wall 2a at the outer side of the tire to that Hi of the side wall 2b at the inner side thereof satisfies Ho/Hi=1.2–6.5. The attenuation coefficient Ho of the side wall 2a is determined on the basis of a multi-spot averaged thickness Go thereof and a loss factor $\tan\delta o$ of the rubber constituting this side wall, i.e., equals a product thereof. The attenuation coefficient Hi of the wall 2b is determined on the basis of a multi-spot averaged thickness Gi thereof and a loss factor $\tan\delta i$ of the rubber constituting this side wall, i.e., equals a product thereof. The tire thus formed is fitted on a wheel of an asymmetric structure wherein a position, in which the disc is connected to the rim, is offset from the center of width of the rim toward the outer side of the wheel.

Thus, a ratio (Ho/Hi) of an attenuation coefficient Ho of an outer side wall 2a of a tire to that Hi of an inner side wall 2b thereof is set in the range of 1.2–6.5 so that the vibration attenuation rate of the outer portion of the tire becomes relatively high, and such a tire is fitted on a wheel of an asymmetric structure wherein a position, in which the disc is connected to the rim, is offset toward the outer side of the wheel. This enables the quantity of vibration transmitted from the tire to the vehicle body via the wheel to decrease, and the driving comfort to be improved. When Ho/Hi is less than 1.2, the attenuation coefficient Ho of the side wall 2a at the outer side of the tire becomes relatively low. Consequently, the quantity of vibration transmitted from the outer side of the tire to the vehicle body becomes large, and the driving comfort lowers. When Ho/Hi exceeds 6.5, the thickness of the inner side wall 2b of the tire necessarily decreases, so that the maneuvering stability of the vehicle lowers.

According to the present invention, each of the multi-spot averaged thicknesses Go, Gi of the side walls 2a, 2b is determined by dividing the portion of a tire which is between 20% to 75% of the radial height SH of a cross section of the tire measured from the radially inner edge of a bead core 3 to outer radial surface of the tread into ten equal parts, measuring the thickness of the rubber, which constitutes the side wall, of each of these ten divisional parts along a straight line passing a circumferentially intermediate point therein and reaching the outer surface of the carcass 1, bead filler 4 or other composite member at right angles thereto, and averaging the values of thickness of these ten divisional parts with respect to the respective intermediate points. The loss factors $\tan\delta o$, $\tan\delta i$ of the rubber constituting the side walls 2a, 2b are values determined under the conditions including a temperature of 20° C., a frequency of 20 Hz, initial strain of 10% and dynamic strain of ±2%.

A preferred range for the first multi-spot averaged thickness Go of the first side wall of the tire is set to 2.5–4.0 mm with the second multi-spot averaged thickness Gi of the second side wall thereof set to 1.5–2.5 mm. A preferred range for the loss factor $\tan\delta o$ of the rubber constituting the first side wall of the tire is set higher than that $\tan\delta i$ of the rubber constituting the second the wall thereof. Preferably, loss factor $\tan\delta o$ is set to 0.18–0.25 while loss factor $\tan\delta i$ is set to 0.11–0.16.

The above-described pneumatic tire of an asymmetric structure according to the present invention can displays an intended operational effect when it is combined with a wheel of an asymmetric structure. Therefore, it is desirable that the side of a tire which is to be set on the outer side of a wheel and an offset distance of a disc in a wheel on which the tire should be fitted be shown on the side wall surface of the tire.

According to the present invention described above, a ratio (Ho/Hi) of an attenuation coefficient Ho determined on the basis of the multi-spot averaged thickness Go of an outer side wall of a tire and a loss factor $\tan\delta o$ of the rubber constituting this side wall to that Hi determined on the basis of an average thickness Gi of an inner side wall of the tire and a loss factor $\tan\delta i$ of the rubber constituting this side wall is set in the range of 1.2 to 6.5, more preferably, 1.2 to 6.0. Therefore, the quantity of vibration transmitted from the tire to the vehicle body via the wheel can be decreased, and the driving comfort can be improved. Since the rigidity of the outer and inner side walls of the tire can be set equal to or not lower than that of the side walls of a conventional pneumatic tire, the driving performance of a vehicle including the maneuvering stability thereof does not substantially lower.

EXAMPLE

Seven types of pneumatic tires (tires 1–5 according to the present invention and comparative tires 1 and 2) having a tire size of 175/70R13 were produced by using compounds A–D, which are shown in Table 1, as rubber constituting the side walls thereof with a ratio (Ho/Hi) of an attenuation coefficient of the outer side wall to that of the inner side wall set variously. The loss factors $\tan\delta$ of the compounds A–D were determined by using a visco-elasticity spectrometer (manufactured by the Iwamoto Seisakusho K. K.) under the conditions including a temperature of 20° C., a frequency of 20 Hz, initial strain of 10% and dynamic strain of ±2%.

TABLE 1

|  | Compound | | | |
|---|---|---|---|---|
| $\tan\delta$ | A<br>0.18 | B<br>0.25 | C<br>0.16 | D<br>0.11 |
| Composition (part by weight) | | | | |
| Natural rubber | 40 | 40 | 40 | 40 |
| Butadiene rubber | 60 | 60 | 60 | 60 |
| HAF carbon | 40 | 55 | 35 | — |
| GPF carbon | — | — | — | 35 |
| ZnO | 3.0 | 3.0 | 3.0 | 3.0 |
| Stearic acid | 1.0 | 1.0 | 1.0 | 1.0 |
| Age resister | 3.0 | 3.0 | 3.0 | 3.0 |
| Wax | 1.0 | 1.0 | 1.0 | 1.0 |
| Aroma oil | 10 | 13 | — | — |
| Sulfur | 1.8 | 1.8 | 1.8 | 1.8 |
| Vulcanization accelerator NS | 0.4 | 0.4 | 0.4 | 0.4 |
| Vulcanization accelerator DM | 0.4 | 0.4 | 0.4 | 0.4 |

TABLE 2

|  |  | Outer side of tire | | Inner side of tire | |
|---|---|---|---|---|---|
|  | Ho/Hi | $\tan\delta o$ | Go (mm) | $\tan\delta i$ | Gi (mm) |
| Comparative tire 1 | 1.0 | 0.16 | 2.5 | 0.16 | 2.5 |
| Tire 1 according to the present invention | 1.1 | 0.18 | 2.5 | 0.16 | 2.5 |
| Tire 2 according to the present invention | 1.2 | 0.16 | 3.0 | 0.16 | 2.5 |
| Tire 3 according to the present invention | 1.3 | 0.18 | 3.0 | 0.16 | 2.5 |
| Tire 4 according | 2.0 | 0.18 | 3.0 | 0.11 | 2.5 |

TABLE 2-continued

|  | Ho/Hi | Outer side of tire | | Inner side of tire | |
|---|---|---|---|---|---|
|  |  | tanδo | Go (mm) | tanδi | Gi (mm) |
| to the present invention |  |  |  |  |  |
| Tire 5 according to the present invention | 6.0 | 0.25 | 4.0 | 0.11 | 1.5 |
| Comparative tire 2 | 7.0 | 0.25 | 3.0 | 0.11 | 1.0 |

The tires 1–5 according to the present invention and comparative tires 1 and 2 were fitted on an asymmetric wheel (rim size: 13×5J, offset distance of the rim: 30 mm) and subjected to the following projection run-over test, road noise test and maneuvering stability test. The results are shown in Table 3.

Projection Run-Over Test

A driving test was conducted on a drum 1707 mm in diameter, which was provided with 5 mm projections, under the conditions including an air pressure of 2.0 kg/cm$^2$, a load of 200 kg an a speed of 50 km/hr. During this test, a difference between maximum and minimum values of a longitudinal impact force (kgf) was determined, and the driving comfort was evaluated on the basis of the result. The results are shown by indexes with respect to a base value (100) which represents the index of the comparative tire 1. The larger index values indicate better driving comfort.

Road Noise Test

A small passenger car of displacement of 1500 cc equipped with test tires having an inner pressure of 2.0 kg/cm$^2$ was made run on a rough road surface at a speed of 50 km/hr, and the sound pressure was measured with a microphone set in the position of the window side ear of a driver sitting on the driver's seat in the interior of the car, and the noise performance of the tires was evaluated on the basis of the results. The evaluation results are shown by indexes with respect to a base value (100) which represent the index of the comparative tire 1. The larger indexes indicate better noise performance.

Maneuvering Stability Test

The same vehicle that is mentioned in the paragraph of road noise test with the test tires equipped therewith was made run on a slalom test road on which pylons were set up at regular intervals, and the maneuvering stability was evaluated on the basis of the average travelling speed. The evaluation results are shown by indexes with respect to a base value (100) which represents the index of the comparative tire 1. The larger indexes indicate better steering stability.

TABLE 3

|  | Ho/Hi | Noise performance | Driving comfort | Steering stability |
|---|---|---|---|---|
| Comparative tire 1 | 1.0 | 100 | 100 | 100 |
| Tire 1 according to the present invention | 1.1 | 101 | 100 | 100 |
| Tire 2 according to the present invention | 1.2 | 103 | 102 | 100 |
| Tire 3 according to the present invention | 1.3 | 104 | 104 | 100 |
| Tire 4 according to the present invention | 2.0 | 105 | 105 | 100 |
| Tire 5 according to the present invention | 6.0 | 105 | 107 | 99 |
| Comparative tire 2 | 7.0 | 105 | 108 | 96 |

As is clear from Table 3, the driving comfort and noise performance of the tires 1–5 according to the present invention are superior to those of the comparative tire 1, and the maneuvering stability of the former tires does not substantially lower. The comparative tire 2 in which Ho/Hi was set to 7.0 had a decreased multi-spot averaged thickness Gi of 1.0 mm of the inner side walls thereof, so that the maneuvering stability thereof became low.

What is claimed is:

1. A pneumatic tire in combination with a wheel, said wheel having a rim, a disc connected to the rim at a position offset from a center of the width of the rim in a direction toward an outer side of the wheel when mounted on a vehicle, an offset side rim end and an anti-offset side rim end, said tire comprising: a tread, outer and inner side walls continuing from both sides of said tread, and bead portions continuing from the end portions of said side walls, said outer side wall being fitted to the offset-side rim end of the wheel and said inner side wall being fitted to the anti-offset side rim end of the wheel, wherein a ratio Ho/Hi of a first attenuation coefficient Ho=Go×tanδo determined on the basis of a first multi-spot averaged thickness Go of said outer side wall of said tire and a loss factor tanδo of the rubber of said outer side wall to a second attenuation coefficient Hi=Gi×tanδi determined on the basis of a second multi-spot averaged thickness Gi of said inner side wall of said tire and a loss factor tanδi of the rubber of said inner side wall is set in the range of 1.2–6.5; said first and second multi-spot averaged thicknesses are determined by dividing a portion of the respective side wall between 20% to 75% of radial height SH of a cross-section of the tire measured from a radially inner edge of a bead core to an outer radial surface of said tread into ten equal parts, measuring the thickness of rubber of each part along a straight line passing a circumferentially intermediate portion therein and reaching an outer surface of an underlying member at right angles thereto, and arithmetically averaging the values of thickness of the ten divisional parts with respect of the respective intermediate points; first multi-spot averaged said thickness Go of said outer side wall of said tire is set larger than said second multi-spot averaged thickness second Gi of said inner side wall thereof; and said first multi-spot averaged thickness Go of said outer side wall of said tire is set to 2.5–4.0 mm with said second multi-spot averaged thickness Gi of said inner side wall thereof set to 1.5–2.5 mm.

2. A pneumatic tire according to claim 1, wherein said loss factor tanδo of the rubber constituting said outer side wall of said tire is set higher than that tanδi of the rubber constituting said inner side wall thereof.

3. A pneumatic tire according to claim 2, wherein said loss factor tanδo of the rubber constituting said outer side wall of said tire is set to 0.18–0.25 with said loss factor tanδi of the rubber which constitutes said inner side wall thereof set to 0.11–0.16.

4. A pneumatic tire according to claim 1, wherein the outer surfaces of said side walls have marks showing the sides of said wheel on which said side walls are to be set when said tire is fitted on said wheel.

5. A pneumatic tire according to claim 1, wherein the outer surface of one of said side walls has figures representative of a quantity by which a disc of a suitable wheel is offset.

6. A pneumatic tire according to claim 1, wherein said ratio Ho/Hi is from 1.2 to 6.0.

* * * * *